UNITED STATES PATENT OFFICE.

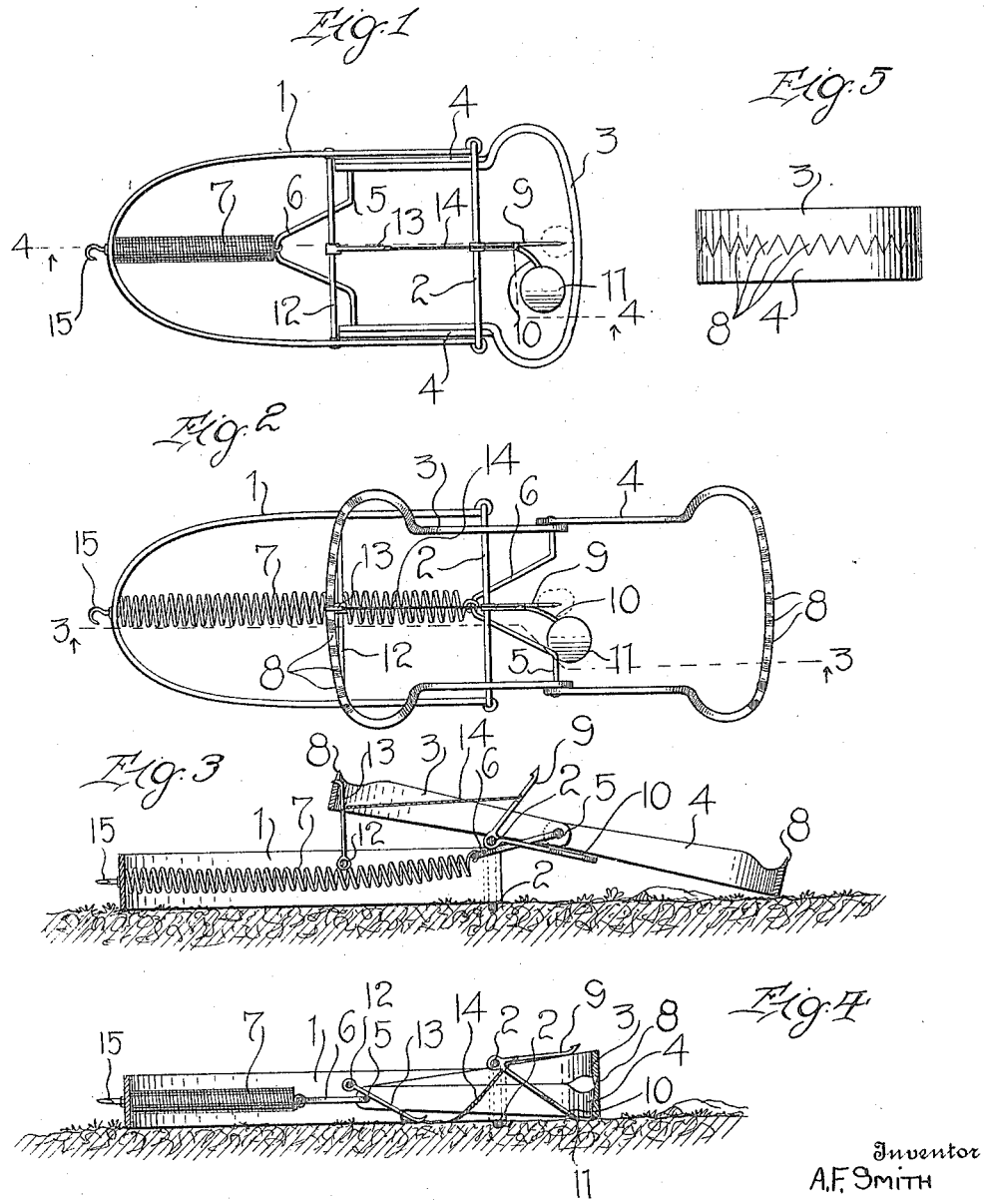

ALBERT F. SMITH, OF SILOAM SPRINGS, MISSOURI.

TRAP.

1,123,410.

Specification of Letters Patent.

Patented Jan. 5, 1915.

Application filed January 23, 1914. Serial No. 813,956.

*To all whom it may concern:*

Be it known that I, ALBERT F. SMITH, a citizen of the United States, residing at Siloam Springs, in the county of Howell and State of Missouri, have invented certain new and useful Improvements in Traps, of which the following is a specification, reference being had to the accompanying drawings.

This invention relates to new and useful improvements in traps and more particularly to an animal trap and the primary object of the invention is to provide a device of this character which will be most positive in its action to engage an animal when the tripping device set therefor, is actuated.

A further object of the invention resides in providing a trap of improved construction which is simple and durable, inexpensive to manufacture and very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a plan view of a device constructed in accordance with my invention, showing the jaws of the trap in their closed positions. Fig. 2 is a similar view showing the trap set for operation. Fig. 3 is a section therethrough as seen on line 3—3, Fig. 2. Fig. 4 is a section as seen on line 4—4, Fig. 1; and Fig. 5 is an end elevation of the device in its closed and operative position.

In describing my invention, I shall refer to the drawing in which similar reference characters designate corresponding parts throughout the several views and in which 1 indicates a substantially U-shaped body or base member, the free ends of the arms of which are connected by a closed loop or link 2.

Adapted to be guided through the arms or the like of the link or loop 2, are a pair of U-shaped jaw members 3 and 4, these jaw members being pivoted at their free ends to the ends of a transverse arm 5. This arm 5 is offset intermediate of its ends, as indicated at 6 and this offset portion is engaged with one end of a coil spring 7, the opposite end of the coil spring being securely engaged with the base of the U-shaped member 1. The normal tendency of this spring 7 is to draw inwardly upon the arm 6, whereby to draw the arms 3 and 4 inwardly through the loop or link 2 and the base portions of the U-shaped members 3 and 4 are provided with prongs or teeth 8, so that when said members 3 and 4 are brought together in their normal position, under tension of the spring 7, the teeth thereof will coöperate with one another to form co-acting jaws.

Mounted for oscillation on the upper bar or arm of the closed loop or link 2, is an arm 9, the free end of which is adapted to receive the bait and this arm forms a trigger or the like, as will be seen from the following description. Carried on the arm or trigger 9, is an additional arm 10 which has a pedal-like member 11 carried or formed on the free end thereof. When the device is set, the proper actuation of either the arm 9 or the arm 10 will actuate the device. Mounted for oscillation between the arms of the U-shaped member 1, intermediate the ends of the latter, is a transverse bar 12 and formed or carried thereon, is a projection 13 which is designed to form a catch member. Connected to the catch member and the arm 9, is a flexible connection 14, so as to actuate the same simultaneously.

In setting the trap, the arms 3 and 4 are drawn outwardly through the link or loop 2, until both of said arms are beyond the same, thus expanding the spring 7 to a considerable extent. The arms 3 and 4 are then opened with respect to one another, the arm 3 being thrown back upon the member 1 and engaged with the catch member 13. When so engaged, the bait trigger or arm 9 extends somewhat upwardly and the foot engaging pedal or the like 11 carried on the arm 10 disposed somewhat outwardly. A bait is applied to the arm 9 and when nibbled at to the proper degree, or when an animal steps on the pedal member 11, it will be seen that the flexible connection 14 will be drawn so as to disengage the catch member 13 from the jaw 3. The tension of the spring 7 will be so great as to immediately force the jaw 3 downwardly upon the jaw 4, at the same time tending to draw both of said jaws inwardly through the loop or link 2. The animal will, obviously be caught between the jaws and securely held therebetween, until such time as removed by the operator.

The base portion of the member 1 is provided with a hook or the like 15, with which may be engaged the end of a link chain or other flexible connection, whereby the trap proper may be secured to a stationary object.

From the foregoing it will be seen that I have provided an improved trap which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. A trap of the class described comprising a U-shaped base member, a closed loop connecting the ends of the arms of the base member, a pair of U-shaped jaws, a pivot arm upon which the free ends of the jaws are pivotally mounted, a spring connected at one end to the pivot arm and at its other end to the base member intermediate of its ends, said spring member being adapted to normally hold the jaws within said loop, means for holding the jaws in open position against the tension of the spring, and means for releasing the last mentioned means to permit said spring to draw the jaws to their closed position.

2. A trap of the class described comprising a U-shaped base member, a loop connecting the free ends thereof, a pair of U-shaped members pivoted together at the free ends of the arms thereof and adapted for disposition through the aforesaid loop, connecting means between the pivotal ends of the U-shaped jaw members, spring means between said base member and the means connecting the ends of the jaws to normally dispose the latter through said loop and to their closed positions with respect to one another, a catch member pivotally carried on the base and adapted for engagement with one jaw member to retain said jaws in their open positions beyond the loop on the base member, and a trigger carried on the base member in connection with the catch member for disengaging the latter from the jaw members, whereby to permit the latter to be disposed to their closed positions.

3. A trap of the class described comprising a U-shaped base member, a closed loop connecting the free ends thereof, a pair of U-shaped jaws pivoted one to the other at the ends of the arms thereof, said jaws being adapted for disposition through the aforesaid closed loop, connecting means between the pivotal ends of the arms of said jaw members, spring means engaged with said connecting means and a portion of the base member to normally dispose said jaw members through the loop to their closed positions, a transverse bar connecting the arms of the base member intermediate the ends thereof, a catch member pivotally carried on said bar and adapted for engagement with one of the jaw members, whereby to retain both of said jaw members in their outspread and open positions on the loop of the base member, a trigger pivotally carried on the upper portion of the loop on said base member, and connecting means between said trigger and said catch member whereby to dispose the latter to its ineffective position upon the actuation of the trigger, whereby said jaws may be disposed through the loop of said base member to their closed positions.

In testimony whereof I hereunto affix my signature in the presence of two witnesses.

ALBERT F. SMITH.

Witnesses:
ETHEL HOLLINGSHAD,
J. M. SMITH.

Copies of this patent may be obtained for five cents each, by addressing the "Commissioner of Patents. Washington, D. C."